July 15, 1947.     J. KIS     2,423,983
ADJUSTABLE TOOL HOLDER
Filed Aug. 30, 1944
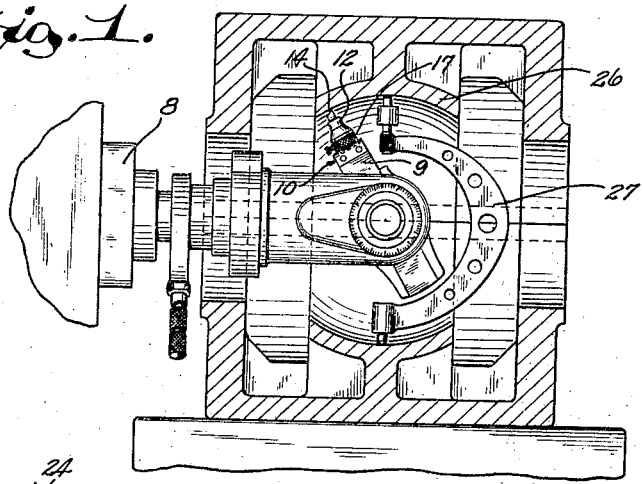
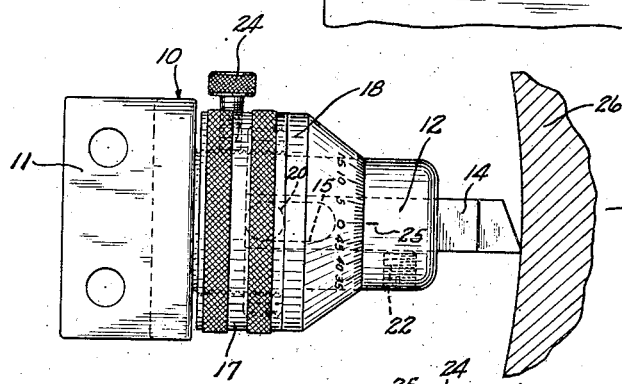
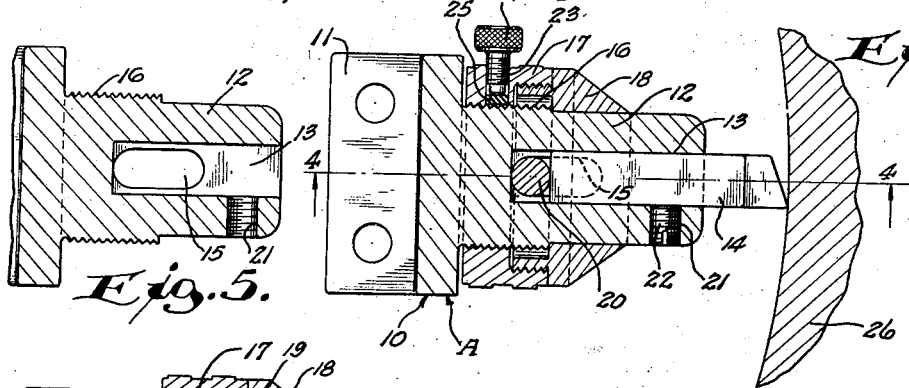
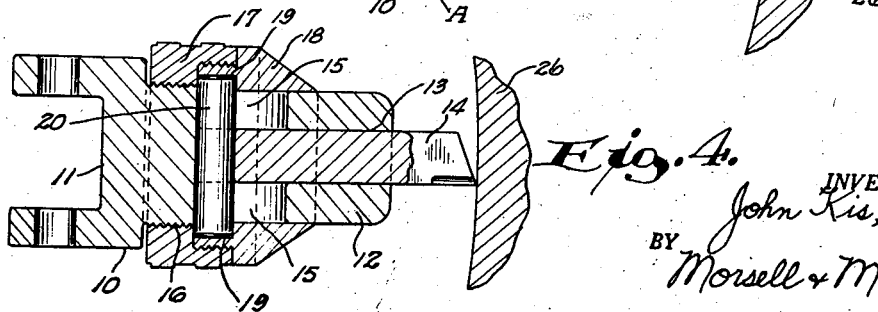
INVENTOR.
John Kis,
BY Morsell & Morsell
ATTORNEYS.

Patented July 15, 1947

2,423,983

UNITED STATES PATENT OFFICE 2,423,983

ADJUSTABLE TOOLHOLDER

John Kis, Racine, Wis.

Application August 30, 1944, Serial No. 551,889

2 Claims. (Cl. 29—105)

This invention relates to improvements in Adjustable tool holders, and more particularly to a tool holder adapted for use on a machine tool such as a universal machine head.

My Patent No. 1,834,716 illustrates a universal machine head which is adapted for mounting on the shaft of a boring machine, a vertical machine, a milling machine or similar types of spindle machines in which the work remains stationary and the tools turn therearound. Said universal machine head of my prior patent is especially adapted for boring inside and outside tapers, turning outside taper hubs, turning perfect radii, undercutting, forming straight or beveled faces, etc. In said machine head there is a tool holding member for removably holding the tool which operates on the work. Certain types of work make desirable independent precision adjustment of the tool holder, and it is, therefore, a primary object of the present invention to provide a tool holder for a machine head of the type mentioned, or the like, which tool holder is susceptible of very minute accurate adjustments for facilitating accurate radii turning, taper and straight boring, facing and turning and like operations.

A further object of the invention is to provide an adjustable tool holder susceptible of adjustments to advance or retract the tool in accordance with the readings of a micrometer applied to a spherical surface being worked on.

A further object of the invention is to provide an adjustable tool holder wherein there is a three-point bearing between the tool and the adjustable members, insuring precision adjustments, with no opportunity for sloppiness in the advancement of the tool.

A further object of the invention is to provide an adjustable tool holder in which the tool adjusting element has a beveled graduated dial which facilitates the taking of readings from externally of the tool holder and work.

A further object of the invention is to provide an adjustable tool holder in which there is a line contact between a shiftable cylindrical member and the bottom portion of the tool, insuring a uniform contact between the tool shifting member and the tool to produce extremely accurate and minute adjustments.

A further object of the invention is to provide an adjustable tool holder which is of very simple construction, is strong and durable, is readily applied to a machine head, is easily operated and controlled, and is well adapted for the purposes described.

With the above and other objects in view, the invention consists of the improved adjustable tool holder and its parts and combinations as set forth in the claims, and all equivalents thereof.

In the accompanying drawing, in which the same reference characters indicate the same parts in all of the views:

Fig. 1 is a sectional view through a piece of work being bored by the tool, showing a fragmentary portion of a universal machine head equipped with the improved tool holder and the tool carried thereby in relation to the work, there also being shown in the work an offset micrometer for measuring the diameter of the bore without interfering with the position of the tool;

Fig. 2 is a side view of the improved tool holder and tool carried thereby engaging a curved work surface, there being a fragmentary, sectional showing of the latter;

Fig. 3 is a longitudinal vertical sectional view of the showing in Fig. 2;

Fig. 4 is a sectional view taken on line 4—4 of Fig. 3; and

Fig. 5 is a detail, sectional view of the fixed unit of the adjustable tool holder.

Referring now particularly to Fig. 1 of the drawing, it will appear that a fragmentary portion of a universal machine head, such as is disclosed in my Patent No. 1,834,716, is indicated by the numeral 8. The machine head includes an adjustable boring bar 9 to an end of which is attached the improved adjustable tool holder indicated generally by the numeral 10 and the subject matter of the present invention.

As will appear from Figs. 2, 3 and 4, the tool holder comprises a unit having a yoked end 11 which is rigidly secured to the machine head boring bar 9 by any suitable means. Integral with and extending outwardly from the yoke portion 11 is a nipple 12 provided with an elongated axial recess 13 of square form in cross section and extending inwardly substantially from the outer end of the nipple. Said recess is adapted to have inserted therein the squared shank portion of a cutting tool 14. Toward the inner end of the recess 13, opposite side walls defining the same, are formed with elongated openings 15 for a purpose hereinafter to be described. The outer surface of the nipple, toward the inner end thereof, is slightly enlarged and is provided with external screw threads 16, preferably of a twenty pitch.

An outer adjusting nut 17 threadably engages the externally threaded portion 16 of the nipple. The external portion of the adjusting nut is suitably knurled to facilitate manual operation thereof and the adjusting nut has positively attached thereto a bored forward extension 18 which movably embraces the reduced unthreaded outer surface of the nipple 12.

The nut extension 18 is provided with an internal annular recess 19 which receives the ends of a cylindrical pin 20. The pin extends diametrically through the nipple 12 adjacent the lower end of the nipple recess 13, and the pin is of somewhat greater length than the diameter of the nipple so as to have its ends project into said recesses 19 in the nut extension 18. The pin also is accommodated by the nipple slots 15 for relative movement therein.

When the nut 17 is turned on the nipple thread 16 in the proper direction, the nut 17 and its extension 18, will turn as a unit, advancing this unit a desired distance outwardly on the embraced nipple 12. It will be noted that both ends of the cylindrical pin 20 are engaged by the nut. Hence, when the nut is advanced outwardly on the nipple, the pin will be evenly re-acted against by the nut and will be forced axially of the nipple, riding in the nipple slots 15. The intermediate outer surface portion of the pin 20 has a straight line contact with the inner end of the tool 14, and the movement of the nut 17, which uniformly and evenly re-acts against the pin 20 to advance it, applies this uniform pressure for advancing purposes along a line of contact with the rear of the tool to cause precise adjustment of the tool and smooth movement thereof.

It will be noted from Figs. 3 and 5 that the outer end of the nipple 12 is provided with a transverse internally threaded bore 21, and said bore receives a clamping bolt 22. This clamping bolt must be loosened when the tool 14 is to be shifted in the socket of the nipple 12. When the proper adjustment has been attained, the bolt is tightened so as to clampingly impinge against the side of the tool. Likewise, the adjusting nut 17 is provided with a tapped opening 23, which receives a clamping bolt 24. Movements of the adjusting nut are not attainable unless the clamping bolt 24 is loosened. The adjusting nut is held in an advanced or retracted position by tightening the bolt 24 to cause its inner end to impinge against a fiber disc 25, which then clampingly engages a threaded portion of the inner end of the nipple 12.

It will be noted that the forward end portion of the nut extension 18 is tapered or beveled. This tapered or beveled portion of the nut extension is formed as a graduated dial, as best shown in Fig. 2, and the graduations thereon can, for the purposes of measuring adjustments of the tool 14, be registered with a fixed graduation 25 on an adjacent surface portion of the nipple 12.

The relationship of the improved adjustable tool holder 10 to the boring bar 9 of the universal machine head 8 is best shown in Fig. 1, wherein the mechanism is shown to indicate the tool being used to bore a casting 26. The type of work illustrated requires extremely accurate precision adjustments of the tool 14 in addition to the adjustments obtainable on the universal machine head. A novel form of micrometer 27 is illustrated, in association with the bore of the work and with the tool and boring bar. Normally, in taking inside spherical radius measurements, it is necessary to move the boring bar of the machine tool or to pivotally move out of the way the cutting tool. This is objectionable because it then requires a resetting of the tool or boring bar. With the improved micrometer 27, used in connection with the universal machine head and adjustable tool holder, the machine head, boring bar and tool may be left in position in the bore of the work and a measurement taken with the micrometer. This is permitted by virtue of the offset or curved construction of the micrometer which can be swung to clear all of the adjacent portions of the machine tool, boring bar, etc. Any required adjustments indicated by the micrometer reading can be taken care of on the adjustable tool holder to further advance the tool 14 and the graduations or calibrations on the dial portion of the nut extension 18 are arranged to correspond with the readings on the dial of the micrometer 27.

From the foregoing description, it will be apparent that the improved adjustable tool holder is readily applicable to various types of metal working machines, is susceptible of easy manipulation to adjust the position of the tool, insures smooth, accurate and minute adjustments of the tool, and is well adapted for the purposes described.

What is claimed as the invention is:

1. A tool holder and tool assembly, comprising a socket member, the walls of the same on opposite sides of the inner end of the socket being formed with slots, a tool having its shank longitudinally adjustably, and quickly removably mounted in the socket member, an adjusting nut threadably mounted on the socket member and having an internal recess, said nut having a forward, beveled extension bearing a calibrated scale, a bar of greater length than the diameter of the socket member extended transversely through the socket member socket and slots and having its opposite ends lodged in said nut recess, an intermediate portion of the bar having a line contact with the inner end of the tool to apply even advancing pressure against the tool when the nut is turned outwardly, and set screw means for releasably clamping the nut and tool in selected positions relative to the socket member.

2. A tool holder and tool assembly, comprising a socket member, the walls of the same on opposite sides of the inner end of the socket being formed with slots, a tool having its shank longitudinally adjustably, and quickly removably mounted in the socket member, an adjusting nut threadably mounted on the socket and having an internal, annular recess, a bar of greater length than the diameter of the socket member extending transversely through the socket member socket and slots and having its opposite ends lodged in said nut recess, an intermediate portion of the bar having a line contact with the inner end of the tool to apply even advancing pressure against the tool when the nut is turned outwardly, and set screw means for releasably clamping the nut and tool in selected positions relative to the socket member.

JOHN KIS.

REFERENCES CITED

The following references are of record in the file of this patent:

UNITED STATES PATENTS

| Number | Name | Date |
|---|---|---|
| 1,255,304 | Gairing | Feb. 5, 1918 |
| 2,089,930 | Carlson | Aug. 10, 1937 |
| 2,330,692 | DeVlieg | Sept. 28, 1943 |
| 1,075,699 | Dechnik | Oct. 14, 1913 |
| 1,385,501 | Shreve | July 26, 1921 |
| 1,172,781 | Forsyth et al. | Feb. 22, 1916 |

FOREIGN PATENTS

| Number | Country | Date |
|---|---|---|
| 699,734 | France | Dec. 19, 1930 |
| 161,090 | Great Britain | Apr. 7, 1921 |